(12) United States Patent
Asinger et al.

(10) Patent No.: US 12,493,078 B2
(45) Date of Patent: Dec. 9, 2025

(54) SYSTEM AND METHOD FOR DEGRADATION BASED BATTERY CONTROL

(71) Applicant: Zitara Technologies, Inc., San Francisco, CA (US)

(72) Inventors: Patrick Asinger, San Francisco, CA (US); Evan Murphy, San Francisco, CA (US); Mark Tobenkin, San Francisco, CA (US); Yumeng Gao, San Francisco, CA (US); Daniel Vickery, San Francisco, CA (US); Sandy Yuan, San Francisco, CA (US); Emily Zhang, San Francisco, CA (US); Shyam Srinivasan, San Francisco, CA (US)

(73) Assignee: Zitara Technologies, Inc., San Francisco, CA (US)

( * ) Notice: Subject to any disclaimer, the term of this patent is extended or adjusted under 35 U.S.C. 154(b) by 0 days.

(21) Appl. No.: 18/913,656

(22) Filed: Oct. 11, 2024

(65) Prior Publication Data

US 2025/0123333 A1    Apr. 17, 2025

Related U.S. Application Data (60) Provisional application No. 63/543,698, filed on Oct. 11, 2023.

(51) Int. Cl.
*G01R 31/392* (2019.01)
*G01R 31/367* (2019.01)
(Continued)

(52) U.S. Cl.
CPC ......... *G01R 31/392* (2019.01); *G01R 31/367* (2019.01); *H01M 10/425* (2013.01);
(Continued)

(58) Field of Classification Search
None
See application file for complete search history.

(56) References Cited

U.S. PATENT DOCUMENTS 6,656,234 B2    12/2003  Dexter et al.
7,554,294 B2     6/2009  Srinivasan et al.
(Continued)

FOREIGN PATENT DOCUMENTS

CN    111438077 A    7/2020
DE    112017004755 T5    6/2019
(Continued)

OTHER PUBLICATIONS

"Meta-Model Mechanism", https://www.cs.wmich.edu/~ooda/metamodel.html.
(Continued)

*Primary Examiner* — Jas A Sanghera
(74) *Attorney, Agent, or Firm* — Jeffrey Schox; Randy Mehlenbacher (57) ABSTRACT

A method can include receiving battery sensor measurements, determining a state of the battery (e.g., SoH, SoC, SoE, SoP, etc. or information correlated therewith such as internal resistance, open circuit voltage, etc.), estimating an aging profile or degradation of the battery for one or more operating conditions, and determining operating conditions for the battery based on the estimated degradation.

19 Claims, 4 Drawing Sheets

(51) Int. Cl.
  *H01M 10/42* (2006.01)
  *H01M 10/44* (2006.01)
  *H01M 10/46* (2006.01)
  *H01M 10/48* (2006.01)
  *H02J 7/00* (2006.01)

(52) U.S. Cl.
  CPC ....... *H01M 10/441* (2013.01); *H01M 10/443* (2013.01); *H01M 10/46* (2013.01); *H01M 10/482* (2013.01); *H01M 10/486* (2013.01); *H02J 7/0048* (2020.01); *H02J 7/005* (2020.01); *H01M 2010/4271* (2013.01)

(56) References Cited

U.S. PATENT DOCUMENTS

| | | |
|---|---|---|
| 7,847,558 B2 | 12/2010 | Runkle et al. |
| 7,894,512 B2 | 2/2011 | Beadle et al. |
| 8,723,527 B2 | 5/2014 | Kudo et al. |
| 8,961,004 B2 | 2/2015 | Srinivasan et al. |
| 9,593,952 B2 | 3/2017 | Goodall et al. |
| 9,726,730 B2 | 8/2017 | Gross |
| 9,989,595 B1 | 6/2018 | Wang et al. |
| 10,153,521 B2 | 12/2018 | Beaston |
| 10,209,314 B2 | 2/2019 | Garcia et al. |
| 10,295,606 B2 | 5/2019 | Mccoy |
| 10,310,022 B2 | 6/2019 | Park et al. |
| 10,422,834 B2 | 9/2019 | Tang |
| 10,446,879 B2 | 10/2019 | Povey et al. |
| 10,489,731 B2 | 11/2019 | Fife |
| 10,656,209 B2 | 5/2020 | Jeon |
| 10,818,981 B2 | 10/2020 | Srinivasan et al. |
| 10,969,752 B1 | 4/2021 | Brink |
| 11,097,633 B1 | 8/2021 | Kohn et al. |
| 11,181,587 B1 | 11/2021 | Srinivasan et al. |
| 11,774,504 B2 | 10/2023 | Murphy et al. |
| 2003/0204328 A1 | 10/2003 | Tinnemeyer |
| 2004/0024559 A1 | 2/2004 | Down et al. |
| 2005/0057255 A1 | 3/2005 | Tate et al. |
| 2005/0269991 A1 | 12/2005 | Mitsui et al. |
| 2006/0217152 A1 | 9/2006 | Fok et al. |
| 2007/0035307 A1 | 2/2007 | Schoch |
| 2010/0070220 A1 | 3/2010 | Darilek |
| 2011/0196633 A1 | 8/2011 | Abe et al. |
| 2011/0246013 A1 | 10/2011 | Yee et al. |
| 2012/0098481 A1 | 4/2012 | Hunter et al. |
| 2012/0175953 A1 | 7/2012 | Ohkawa et al. |
| 2012/0249053 A1 | 10/2012 | Seethaler et al. |
| 2013/0030737 A1 | 1/2013 | Okada |
| 2013/0069660 A1 | 3/2013 | Bernard et al. |
| 2013/0221916 A1 | 8/2013 | Kelty et al. |
| 2014/0167705 A1* | 6/2014 | Chang .................. H02J 7/0048 320/157 |
| 2014/0218040 A1 | 8/2014 | Kim |
| 2014/0244225 A1 | 8/2014 | Balasingam et al. |
| 2014/0333265 A1* | 11/2014 | Kinjo .................. G01R 31/392 320/134 |
| 2015/0046108 A1 | 2/2015 | Akamine |
| 2015/0256003 A1* | 9/2015 | Yonetani ................ B60L 58/16 320/150 |
| 2015/0268309 A1 | 9/2015 | Kim |
| 2015/0280294 A1 | 10/2015 | Shin et al. |
| 2015/0304772 A1 | 10/2015 | Risberg et al. |
| 2015/0369875 A1 | 12/2015 | Ishii |
| 2016/0036272 A1 | 2/2016 | Wartena et al. |
| 2016/0039419 A1 | 2/2016 | Wampler et al. |
| 2016/0041231 A1 | 2/2016 | Lee |
| 2016/0172886 A1 | 6/2016 | Keates |
| 2016/0202324 A1 | 7/2016 | Biletska et al. |
| 2016/0209472 A1 | 7/2016 | Chow et al. |
| 2017/0003352 A1 | 1/2017 | Barre et al. |
| 2017/0104332 A1 | 4/2017 | Wenzel et al. |
| 2017/0123009 A1 | 5/2017 | You et al. |
| 2017/0199247 A1 | 7/2017 | Joe |
| 2017/0244137 A1 | 8/2017 | Guo et al. |
| 2017/0288414 A1 | 10/2017 | Klein et al. |
| 2017/0350944 A1 | 12/2017 | Pajovic et al. |
| 2018/0083461 A1 | 3/2018 | Ravi et al. |
| 2018/0095140 A1 | 4/2018 | Park et al. |
| 2018/0095141 A1 | 4/2018 | Wild et al. |
| 2018/0111599 A1 | 4/2018 | Wang et al. |
| 2018/0136285 A1 | 5/2018 | You et al. |
| 2018/0254632 A1 | 9/2018 | Elbsat et al. |
| 2018/0292465 A1 | 10/2018 | Osara et al. |
| 2018/0337536 A1 | 11/2018 | Li et al. |
| 2018/0358663 A1 | 12/2018 | Yonemoto et al. |
| 2019/0036356 A1 | 1/2019 | Subbaraman et al. |
| 2019/0120908 A1 | 4/2019 | Naha et al. |
| 2019/0168617 A1 | 6/2019 | Ling et al. |
| 2019/0173283 A1 | 6/2019 | Epel et al. |
| 2019/0235217 A1 | 8/2019 | Sugiura et al. |
| 2019/0339330 A1 | 11/2019 | Bryngelsson et al. |
| 2019/0369626 A1 | 12/2019 | Lui et al. |
| 2020/0070682 A1 | 3/2020 | Hellgren |
| 2020/0164763 A1 | 5/2020 | Holme |
| 2020/0203780 A1 | 6/2020 | Mandli et al. |
| 2020/0284846 A1 | 9/2020 | Pajovic et al. |
| 2020/0355749 A1 | 11/2020 | Takahashi et al. |
| 2020/0376968 A1 | 12/2020 | Wang et al. |
| 2020/0379049 A1 | 12/2020 | Gray et al. |
| 2020/0386820 A1* | 12/2020 | Harper .................. H01M 10/48 |
| 2021/0033675 A1 | 2/2021 | Ukumori |
| 2021/0055348 A1 | 2/2021 | Kim et al. |
| 2021/0055353 A1* | 2/2021 | Yazami ................ G01R 31/392 |
| 2021/0152004 A1 | 5/2021 | Basehore et al. |
| 2021/0280920 A1 | 9/2021 | Rinaldo et al. |
| 2021/0349155 A1 | 11/2021 | Srinivasan et al. |
| 2022/0057454 A1 | 2/2022 | Kunisch et al. |
| 2022/0170993 A1 | 6/2022 | Woll |
| 2022/0229114 A1 | 7/2022 | Altaf |
| 2022/0373609 A1 | 11/2022 | Baumann |
| 2022/0416548 A1 | 12/2022 | Killian et al. |
| 2023/0046787 A1* | 2/2023 | Kroener .............. H02J 7/00712 |
| 2023/0184839 A1 | 6/2023 | Murphy et al. |
| 2024/0010100 A1 | 1/2024 | Atukalp et al. |

FOREIGN PATENT DOCUMENTS

| | | |
|---|---|---|
| DE | 102019111956 A1 | 11/2020 |
| DE | 102019111958 A1 | 11/2020 |
| DE | 102019111976 A1 | 11/2020 |
| DE | 102019111979 A1 | 11/2020 |
| DE | 102019121461 B3 | 12/2020 |
| WO | 2016030967 A1 | 3/2016 |
| WO | 2017167777 A1 | 10/2017 |
| WO | 2019017991 A1 | 1/2019 |
| WO | 2020036775 A1 | 2/2020 |
| WO | 2021044134 A1 | 3/2021 |
| WO | 2022058416 A1 | 3/2022 |
| WO | 2023052521 A1 | 4/2023 |

OTHER PUBLICATIONS

Foran, Daniel, et al., "System and Method for Battery Cell Balancing", U.S. Appl. No. 18/933,906, filed Oct. 31, 2024.

Gima, Zachary, et al., "Optimal Sensor Selection for an Electrochemical Li-Ion Battery Model", 2020 ECS—The Electrochemical Society, vol. MA2020-01, A04: Student Battery Slam 4.

Lambert, Fred, "Tesla explains why it limits Supercharging speed after high Nos. of DC charges", Electrek, Tesla Supercharger, May 7, 2017.

Lambert, Fred, "Tesla listens to customers and walks back all software performance reductions tied to frequent use of max power", Tesla, Tesla Model S, Jan. 17, 2017.

Merkle, Lukas, et al., "Architecture of a Digital Twin for Enabling Digital Services for Battery Systems", 2019 IEEE International Conference on Industrial Cyber Physical Systems (ICPS), Taipei, Taiwan, May 6-9, 2019.

Russell, Matthew B., et al., "Stochastic modeling for tracking and prediction of gradual and transient battery performance degradation", Journal of Manufacturing Systems 59 (2021) 663-674.

(56) References Cited

OTHER PUBLICATIONS

Severson, Kristen A., "Data-driven prediction of battery cycle life before capacity degradation", Nature Energy, 4, pp. 383-391 (2019), Mar. 25, 2019.

Uddin, Kotub, et al., "Characterising Lithium-Ion Battery Degradation through the Identification and Tracking of Electrochemical Battery Model Parameters", Batteries 2016, 2, 13; doi: 10.3390/batteries2020013, www.mdpi.com/journal/batteries.

Xiong, Rui, et al., "Critical Review on the Battery State of Charge Estimation Methods for Electric Vehicles", IEEE, vol. 6, 2018, published Dec. 6, 2027.

\* cited by examiner

SYSTEM AND METHOD FOR DEGRADATION BASED BATTERY CONTROL

CROSS-REFERENCE TO RELATED APPLICATIONS

This application claims the benefit of U.S. Provisional Application No. 63/543,698 filed 11 Oct. 2023, which is incorporated in its entirety by this reference.

TECHNICAL FIELD

This invention relates generally to the battery management field, and more specifically to a new and useful system and method in the battery management field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. OVERVIEW

Figure 1:
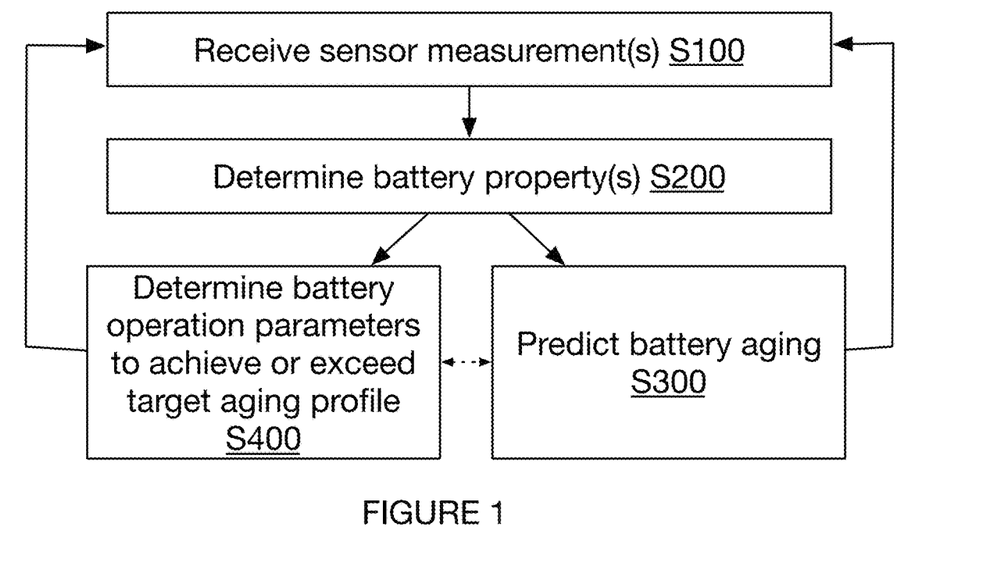
FIG. 1 is a schematic representation of the method.

As shown in FIG. 1, the method can include receiving sensor measurement(s) S100, determining a battery state S200, optionally predicting battery aging S300, determining battery operation parameters S400, and/or any suitable steps.

The method can function to optimize performance of a battery (e.g., battery cell, battery module, battery pack, etc.) of a battery-operated system relative to degradation and/or a degradation curve for the battery (e.g., a measured battery degradation curve, a predicted battery degradation curve, a manufacturer-specified battery degradation, an ideal degradation curve, a degradation curve that optimizes for or against warranty battery repair or replacement, etc.). Exemplary battery-operated systems 20 included: unmanned aerial vehicles (e.g., UAVs, drones, etc.), satellites, rovers, electric vehicles (e.g., electric cars, electric trucks, shipping vehicles, buses, trains, electric passenger vehicles, etc.), electric submarines, electric boats, user devices (e.g., smart phones, computers, power tools, yard tools, toys, etc.), electrical generators, consumer electronics, electric bicycles, scooters (e.g., electric scooters, electric motorbikes, etc.), mobility scooters, wheelchairs, personal transporters (e.g., kick scooters, electric skateboards, self-balancing unicycles, Segway, etc.), electric airplanes, construction equipment, grid energy storage, and/or any suitable battery-operated or leveraging system. In some variants, the method can function to optimize batteries within a fleet of batteries (such as to improve the lifetime, power output, etc. for a single battery within a fleet; improve the lifetime, uptime, power output, etc. for the fleet collectively; etc.). However, the method can perform any function.

2. TECHNICAL ADVANTAGES

Variations of the technology can confer several benefits and/or advantages.

First, the inventors have discovered that by tracking battery states (e.g., battery properties) compared to a predicted battery degradation (e.g., aging) curve, battery operation can be better optimized. For instance, rather than underutilizing a battery to an unknown degree (e.g., slower discharge, operating over a smaller range of state of charge, operating with a small potential range, etc.), a battery can more confidently be utilized closer to its optimal potential. Similarly, the method can help avoid overutilizing a battery (e.g., resulting in expedited battery degradation and aging).

Second, variants of the technology can enable battery operation to be tuned in real- or near-real time (e.g., with battery operation) to achieve the target battery degradation. For example, by retaining a history of battery states over time, battery aging can be tracked. The tracked battery states and current battery states can be compared to the target battery degradation to generate recommended battery operation parameters to achieve the target battery degradation. Related variants of the technology can provide insight into situations where operating a battery (or fleet) in a manner that might increase or decrease a lifetime of the battery can be advantageous.

Third, variants of the technology can benefit from and/or be implemented in a distributed computing architecture leveraging local computing systems (local to the battery) and cloud computing (e.g., cloud computing server). For example, variants of the technology can leverage information from a fleet of battery systems (and/or across different fleets). Fleets of batteries can refer to batteries associated with a common party, batteries within a common geographic region, batteries with common chemistry, batteries from shared manufacturing lots and/or batches, batteries exposed to common environmental conditions, and/or other such groupings of batteries. For instance, batteries of a fleet that have been operated for longer can be leveraged to improve the operating instructions provided for newer batteries in the fleet. Similarly, a subset of batteries within the fleet can be leveraged as test batteries to explore the impact of operations in more or less extreme operating conditions to inform battery degradation models. Additionally or alternatively, some variants can leverage the information across an entire fleet of batteries to optimize at a fleet level (rather than or in addition to at an individual battery level).

Fourth, variants of the technology can provide directional and/or magnitudes of impact for making an operational change (e.g., in the lifetime of a battery). As an illustrative example, the technology could recommend changing a top of charge limit from 4.15V to 3.97V to result in a 4.5% improvement in total anticipated lifetime. In other examples, only the direction can be accounted for (e.g., reduce the battery's top of charge to result in improved lifetime).

Fifth, variants of the technology can extend the useful life of batteries and/or battery fleets, change cost of operations (e.g., avoid penalties from unexpected purchasing contract violations, reduce excess augmentation costs by enabling just-in-time augmentation, etc.) for batteries or fleets of batteries, be leveraged by third parties for incentives (e.g., warranty, insurance, lending, etc.), and/or can otherwise be leveraged.

Sixth, variants of the technology can provide recommended operations that can increase observability into the state of the battery. For instance, specific diagnostic tests can be recommended that can increase observability into the state of the battery (and thereby better inform recommended operating instructions for the battery).

However, variants of the technology can confer any other suitable benefits and/or advantages.

3. SYSTEM

The system can include a computing system 200 (e.g., processor), which can include a model 210, a state estimator 220, a controller 230, and/or any suitable component(s). The system can optionally include one or more batteries 100, one or more sensors 300, an input source 400 (e.g., a user interface such as a touchscreen, stylus, buttons, haptics, auditory, user input, etc. at an operator device, the external system, a user device, etc.), one or more thermal elements 150 (e.g., heat sources, heat sinks, HVAC system, vehicle temperature controller, etc.), and/or any suitable components. The system preferably functions to provide recommended operation parameters to and/or control an external system (e.g., as described above) to which the system is mounted, connected, coupled, in communication with, and/or otherwise interfaces with or is integrated into. However, the system can additionally or alternatively function in any manner.

The battery(s) 100 function to provide power to the computing system, the external system, and/or a component thereof (e.g., a motor, a camera, a load, etc.), and/or can otherwise provide power to any suitable components or systems. The battery(s) are preferably secondary cells (e.g., rechargeable battery), but can be primary cells (e.g., not rechargeable battery), and/or any suitable battery, capacitor, and/or supercapacitor. The battery is preferably mounted to (e.g., integrated in) the external system, but can be remote from the external system (e.g., provide energy to the external system wirelessly), and/or can otherwise be arranged.

Each battery can include one or more: battery cells (e.g., a container to store chemical energy such as a prismatic battery cell, pouch battery cell, cylindrical battery cell, etc.; including an anode, cathode, separator, electrolyte, etc.), battery modules (e.g., groups or clusters of battery cells), battery packs (e.g., an enclosure that includes one or more battery cells or battery modules, processors configured to run software, heating and/or cooling systems, etc. that delivers power to the components of the external system), and/or any suitable components. As discussed herein, models and/or operations can refer to specific battery cells, battery modules, battery packs, and/or combinations or subsets thereof.

Each battery can be described by a set of battery properties. The battery properties can be cell-specific properties, module-specific properties, pack-specific properties, generic properties, and/or any suitable properties. The properties can be static (e.g., fixed such as determined at the time of installation, manufacture, first charge, etc.) and/or variable (e.g., change during operation of the battery, change over time as the battery ages, change depending on the number of battery operation cycles, depend on one or more other battery property, etc.). Battery properties can be: directly measured; calculated, derived, inferred, or estimated (e.g., from directly measured battery properties, from simulations, from charging or discharging the battery, etc.); received (e.g., from a manufacturer, from an operator, from a data sheet, etc.), and/or otherwise be accessed. Battery properties can include internal battery properties and/or external battery properties (e.g., properties associated with an environment that the battery is in).

Exemplary battery properties include: voltage (e.g., open circuit voltage, instantaneous voltage, nominal voltage, voltage limits, maximum voltage, minimum voltage, etc.), current (e.g., short circuit current, instantaneous current, end-of-life current limits, beginning-of-life current limits, end-of-life current capabilities, beginning-of-life current capabilities, taper currents, etc.), temperature (e.g., internal temperature; surface temperature; environment temperature; set temperature; local temperature such as an average temperature of a battery cell, temperature within a predetermined area or volume of the battery, etc.; average temperature, etc.), temperature gradient (e.g., within an external system, across a battery cell, across a battery module, across a battery pack, etc.), humidity, pressure (e.g., environmental pressure, mechanical pressure, air pressure, etc.), resistance (e.g., internal resistance, ohmic resistance, capacitive resistance, inductive resistance, instantaneous resistance, etc.), impedance, capacity (e.g., specific capacity), capacitance (e.g., effective capacitance), inductance, component thickness (e.g., anode thickness, cathode thickness, separator thickness, solid-electrolyte interface layer thickness, etc.), cell swelling (e.g., a change in cell thickness or other dimension such as due to gas formation), particle radius (e.g., anode particle radius, cathode particle radius, etc.), transference number, Brugman number (e.g., a representation of electrode particle tortuosity), solution diffusivity, solution volume fraction (e.g., anode, cathode, separator, etc. solution volume fraction), diffusivity (e.g., anode solid diffusivity, cathode solid diffusivity, etc.), reaction rate (e.g., anode reaction rate, cathode reaction rate, etc.), materials (e.g., cathode material, anode material, electrolyte material, separator, etc.), geometry, size, solution conductivity, entropic heating coefficient, thermal conductivity, electrical conductivity, thermal mass, C-rate (e.g., nominal C-rate, maximum C-rate, etc.), charge (e.g., maximum charge, charge current limit, discharge current limit, delivered charge, stored charge, etc.), state (SoX) of the battery (e.g., state of charge (SoC), state of health (SoH), state of power (SoP), state of safety (SoS), state of energy (SoE), etc.), energy (e.g., energy delivered since last charge or discharge, total energy delivered for a given period of time, etc.), power, time (e.g., time since last charge or discharge, age, remaining lifetime, etc.), battery age (e.g., time since battery manufacture, total number of charging and/or discharging cycles, amount of time the battery has been at a target or threshold charge, etc.), ion concentration (e.g., lithium ion concentration), solid electrolyte interface (SEI) characteristics (e.g., SEI thickness, mechanical stability of the bulk SEI, mechanical stability of the SEI-electrode interface, SEI composition, SEI resistance, SEI ionic conductivity, SEI electron tunneling, chemical stability of the bulk SEI, chemical stability of the SEI-electrode interface, SEI layering, SEI heterogeneity, SEI structure, etc. where the electrodes can be one or both of the anode or cathode), and/or any suitable properties.

The optional sensor(s) 300 function to measure one or more battery properties, external system properties, environmental conditions (e.g., of an environment proximal to, surrounding, adjacent to, near, etc.) of the battery or external system, and/or any suitable properties. The sensors can be connected to (e.g., in contact with) the battery(s), collocated with (e.g., mounted to) the external system, remote from the external system (e.g., a wireless sensor), within a threshold distance of the battery and/or components thereof, and/or otherwise be configured. In variants, each cell of a battery can include a sensor, each module of a battery can include a sensor, each battery pack can include a sensor, a subset of cells can include a sensor, a subset of modules can include a sensor, a subset of packs can include a sensor, and/or the sensor can otherwise be associated with any suitable battery(s) and/or load (e.g., a motor, radio, camera, light, resistor, capacitor, etc. such as of an external device).

Exemplary sensors include: battery management systems (BMS) monitors, temperature sensors (e.g., thermometers, thermocouples, a temperature sensing system such as described in U.S. Pat. No. 10,461,374 titled 'BATTERY INTERNAL TEMPERATURE SENSING BATTERY MANAGEMENT SYSTEM' filed 26 Jun. 2017 or in U.S. Pat. No. 10,818,981 titled 'BATTERY INTERNAL TEMPERATURE SENSING BATTERY MANAGEMENT SYSTEM' filed 16 Sep. 2019 each of which is incorporated in its entirety by this reference, etc.), pressure gauges, external system sensors (e.g., odometers, altimeters, power sensors, inertial measurement unit sensors, accelerometers, gyroscopes, etc.), anemometer, weather sensors (e.g., illumination sensors, humidity sensors, road condition sensors, etc.), clocks, electrochemical impedance spectroscopy (EIS) sensors, voltmeters, ammeters, ohmmeters, multimeters, and/or any suitable sensors (e.g., any sensor whose reading is directly or indirectly affected by or correlated with the battery state, any sensor whose outputs are directly or indirectly correlated with one or more battery properties, etc.).

The computing system 200 preferably functions to determine operating conditions for and/or operate a battery to achieve (e.g., match, follow, be within a threshold of, etc.) a target degradation of the battery. However, the computing system can otherwise function. The computing system can be local (e.g., to the system, to the external system, etc.), remote (e.g., server, cloud computing system, etc.), and/or distributed (e.g., between an edge or local computing system and a remote computing system, between two or more local computing systems, between remote computing systems, etc.). The computing system can include any suitable processors (e.g., CPU, GPU, TPU, ASIC, FPGA, etc.), microprocessors, memory, controllers, and/or other components.

The computing system which can include a model 210 (e.g., a battery and/or system model), a state estimator 220, a controller 230, and/or any suitable component(s).

The state estimator 220 preferably functions to estimate a state (e.g., a current state, a future state, etc.) of the battery and/or external system. The state estimator can be on a local computing system, can be on a remote computing system (e.g., run on a cloud server), can be distributed (e.g., run on a local and remote computing system, include a first local state estimator and a second remote state estimator, etc.), and/or can otherwise be implemented. In a first specific implementation example, the state estimator can operate on a local computing system. In a second specific implementation example, a first state estimator can operate on a local computing system where parameters of the first state estimator can be provided by a second state estimator (e.g., operating on a remote computing system). In a third specific implementation example, sensor readings (and/or other suitable inputs) can be transmitted to a remote computing system where the state estimator can reside. However, the state estimator can otherwise be distributed or arranged.

Figure 4:
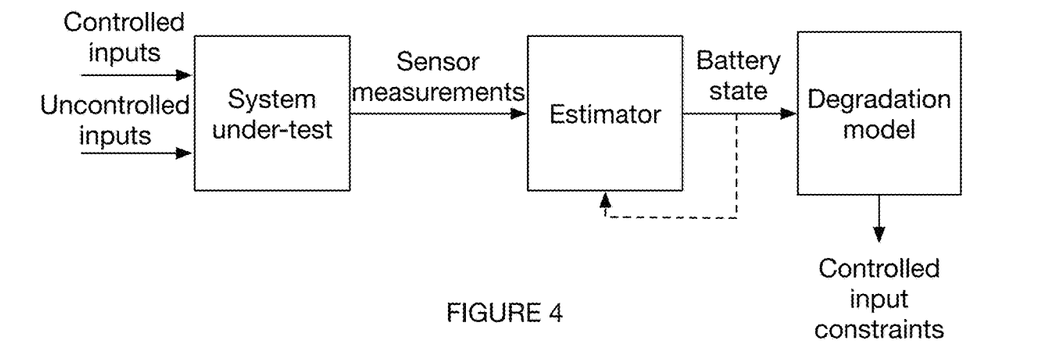
FIG. 4 is a schematic representation of an example of operating a battery and determining battery operation constraints.
Figure 5:
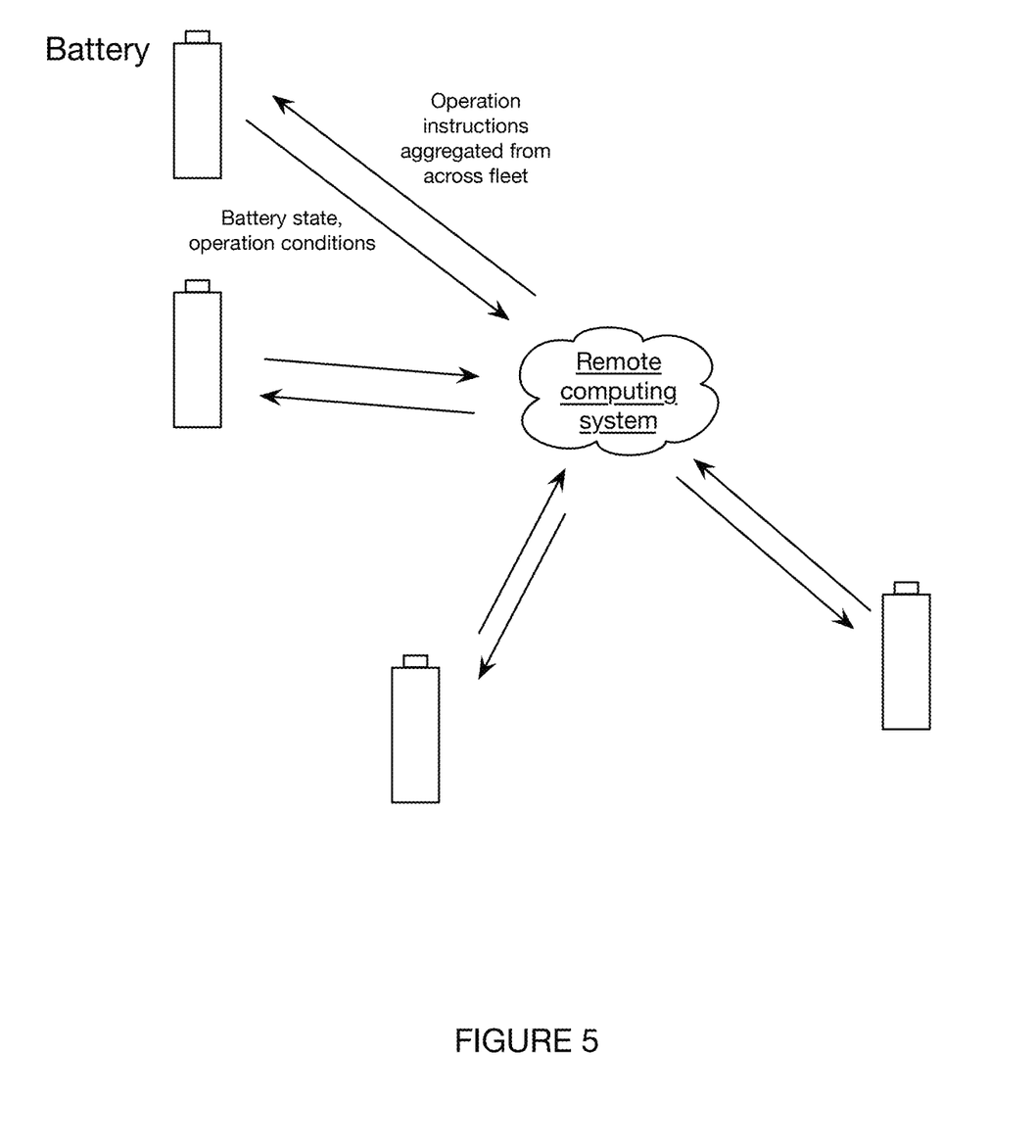
FIG. 5 is a schematic representation of an example of the method that can leverage a fleet of batteries or battery powered systems to provide improved battery control operations to improve an overall lifetime of the fleet and/or lifetime for individual batteries thereof.

Inputs to the state estimator can include: sensor data, filtered data (e.g., sensor data that has been filtered), schedule(s) (e.g., selected mode(s) such as model(s), model noise covariance, hyperparameters, sensor noise covariance, active parameters, inactive parameters, active parameter covariances, etc.; schedules as disclosed in U.S. patent application Ser. No. 17/959,998 titled 'SYSTEM AND METHOD FOR BATTERY MANAGEMENT' filed 4 Oct. 2022, which is incorporated in its entirety by this reference; etc.), battery properties (e.g., historic battery properties, static battery properties, etc.), battery states (e.g., historic battery states, previously computed battery states, as shown for example in FIG. 4, etc.), external system properties, controlled inputs (e.g., a load profile), uncontrolled inputs (e.g., environmental temperature, impact magnitude, impact frequency, etc.), and/or any suitable inputs.

Outputs (e.g., states) from the state estimator can include: states of the battery (e.g., predicted state of the battery during or after operating the battery such as SoC, SoH, SoP, SoS, SoE, etc.), battery properties (e.g., true battery properties, denoised battery properties, estimated battery properties, refined battery properties, etc.), states of the external system, parameters of the model (e.g., active parameters of the model), model error (e.g., estimates of an error in the model parameters, battery properties, battery state, etc.), time (e.g., predicted lifetime of the battery until the battery performance is less than a target performance), and/or any suitable states. For example, outputs (e.g., states determined by) of the state estimator can include a state of charge, temperature, electrochemical state (e.g., cathode ion distribution), model parameters (such as charge capacity and/or other parameters that determine the battery's general performance capability), and/or any suitable outputs. As an illustrative example, the battery outputs could include an internal resistance (e.g., ohmic resistance) for each battery cell and/or supercell (e.g., set of battery cells in series), an internal temperature for each battery cell and/or super cell, a state of health for each battery cell, a state of charge for each battery cell, a state of power for each battery cell, a state of health for a battery pack, a state of charge for a battery pack, a state of power for a battery pack, and/or other suitable outputs.

The state estimator can include: a Kalman filter, an extended Kalman filter, an unscented Kalman filter, an ensemble Kalman filter, a look-up table, a Markov Chain Monte Carlo technique, linearization techniques, machine learning techniques (e.g., a neural network), Gaussian process regression, Schmidt-Kalman filter, and/or any suitable particle filter, sequential Monte Carlo technique, or other state estimator. The state estimator (e.g., type, where the state estimator runs, etc.) can depend on an accuracy of the estimated state (e.g., a target accuracy, based on the application, etc.), an amount of processing power available, and/or otherwise depend on any suitable properties.

In some examples, the state estimator can be a state estimator (or set of state estimators) as disclosed in U.S. patent application Ser. No. 17/314,867, titled 'BATTERY ANALYSIS SYSTEM AND METHOD' filed 7 May 2021 which is incorporated in its entirety by this reference. However, any suitable state estimator can be used.

The model preferably functions to determine one or more battery property (e.g., derived battery property) based on the sensor data. The model is preferably implemented as part of a local computing system (e.g., edge computing). However, additionally or alternatively the model can be implemented as part of a remote computing system (e.g., run on a cloud server), can be distributed (e.g., run on a local and remote computing system, include a first local model and a second remote model, etc.), and/or can otherwise be implemented.

Inputs to the model can include a battery state (e.g., estimated by the state estimator), sensor data (e.g., sensor readings), schedules (e.g., selected models, model noise, etc. such as schedules as disclosed in U.S. patent application Ser. No. 18/235,691 titled 'SYSTEM AND METHOD FOR BATTERY MANAGEMENT' filed 18 Aug. 2023 which is incorporated in its entirety by this reference), external system properties, controlled inputs (e.g., battery operation profile such as anticipated load profile, historic load profile, etc.), uncontrolled inputs (e.g., potential battery operation conditions that are not fully controlled by a battery operator), battery degradation (e.g., predicted, target, desired, etc. relationship between one or more battery property(s) as a function of time), and/or any suitable inputs can be generated. The battery degradation can be a manufacturer specified degradation, a user specified degradation (e.g., a maximum acceptable degradation, a minimum reasonable degradation, a target degradation, etc.), an optimized degradation (e.g., a degradation curve optimized to ensure battery failure occurs during or outside a warranty period, a degradation curve that minimizes degradation of a battery property potentially at the expense of another battery property over time, etc.), and/or any suitable degradation can be used. The degradation can be linear, polynomial, exponential, logarithmic, logistic, and/or have any suitable functional form. As a specific example, a battery degradation model can provide a relationship of a battery cell state of health as a function of inputs across time.

Outputs from the model can include one or more battery properties, errors in the battery properties, time(s) (e.g., time stamps) associated with the battery properties, predicted battery properties at a predetermined time (e.g., time relative to the aging of the battery), predicted battery aging, and/or any suitable outputs. The outputs are preferably generated by processing the inputs according to one or more model.

The models can include battery models, sensor models, system models, and/or any suitable models. The sensor model(s) can function to model how sensor data is acquired, an error associated with sensor measurements, sensor biases, and/or otherwise model the sensor behavior. The battery models are preferably physical models (e.g., model a physical aspect of the battery; model battery physics; etc.), but can alternatively be conceptual models, empirical models, heuristic models, hybrid models, interpretable models, and/or other models. The battery models can function to model (e.g., form a representation of) how the battery operates and/or responds to charging or discharging. For example, battery models can simulate electrical effects, thermal effects, diffusion effects, ion effects, electrochemical effects, aging effects (e.g., predict a future battery property based on current and historic battery properties, predict battery properties at a given time or age for given controlled and/or uncontrolled inputs, etc.), quantum effects, and/or any suitable effects.

The models are preferably parameterized models. However, the models can additionally or alternatively include nonparameterized models, machine learning models (e.g., neural networks), and/or any suitable model types. Parameterization generally refers to what independent variables are associated with a dependent variable and a functional form for how the dependent variable changes with the independent variable. Parameterization can additionally or alternatively include: what elements are lumped together (e.g., how many individual units are described by a given term), and/or otherwise be defined. In an illustrative example, open-circuit voltage (U) can be parameterized as a function of state of charge (SoC), temperature (T, e.g., internal temperature of the battery, environmental temperature, etc.), and/or age of the battery such as: U(SoC,T, age), U(SoC, age), U(T, age), U(SoC,T), U(SoC), U(T), U(age), or U; where f(x) means function f of independent variables x.

Exemplary functional relationships include: polynomials (e.g., constant, linear, quadratic, cubic, quartic, quintic, etc.), exponentials, logarithms, trigonometric functions, logistic functions, hyperbolic functions, sigmoidal functions, radical functions (e.g., square roots, cube roots, etc.), rational functions, transcendental functions, power functions, special functions (e.g., Bessel functions, hypergeometric functions, error functions, delta functions, sinc functions, etc.), differentials (e.g., differentials with respect to time, space, battery properties, etc.), integrals (e.g., with respect to time, space, battery properties, etc.), and/or any suitable functions.

Each parameterization is preferably associated with a set of parameters, where the set of parameters scale or otherwise relate the independent variable to a dependent variable. For instance, in the parameterization of $U(SoC, T)=A*SoC+B*T+C$; A, B, and C are the set of parameters. The independent variables can be associated with (e.g., be, be derived from, be associated with, etc.) one or more sensor measurements, states (e.g., estimated by a state estimator), simulated system properties, and/or any suitable variables. When a variable is not directly measured (e.g., is determined by combining one or more other measured quantities), the variable can be referred to as a 'hidden variable.' However, a hidden variable can otherwise be defined.

The parameters can be active or inactive. Active parameters are preferably parameters that are updated during the use of (e.g., evaluation of, training, determination of, etc.) the model (e.g., are updated, output, etc. by the state estimator). Inactive parameters are preferably parameters that do not change while using the model. The identification of a parameter as an active or inactive parameter can be depend on: a relationship between the parameter and a physical model (e.g., a physical constant can be an inactive parameter), an impact of changes in the parameter to a quality (e.g., accuracy, precision, compute required, processing speed, etc.) of the model (e.g., parameters with a smaller impact can be inactive parameters, parameters with a larger impact can be active parameters, etc.), a covariance between variables or parameters (e.g., when two parameters have a correlation coefficient greater than about 0.5, 0.6, 0.7, 0.8, 0.9, 0.95, 0.99, values therebetween, etc. at least one of the parameters can be inactive), an error in a variable associated with the parameter, an error or uncertainty in determining the parameter value, and/or can otherwise be identified or selected. Inactive parameters can become active parameters and active parameters can become inactive parameters (e.g., as more data is received; as one or more battery properties change; depending on the current use or application of the model such as for state estimation, for prediction, for safety determination, for anomaly prediction, etc.; depending on the current use of the battery such as charging, discharging, storing, active use, etc.; etc.).

The model(s) can include, for example, a thermal model (e.g., a model for determining the thermal distribution, local temperature, thermal diffusion within a battery, battery pack, battery cell, external system, etc.), a heat generation model (e.g., a model for how much heat is generated during operation of the battery such as from electrical charging and/or discharging of the battery, from other heat generating components, etc.), an electrical model (e.g., modeling a battery, battery cell, etc. as a voltage source, resistor, capacitor, inductor, diode, or other electrical component), an electrochemical model, a heat transport model (e.g., a model for how heat is transported within and/or between components), a degradation model, an ion transport model (e.g., $Li^+$ transport model), a quantum mechanical model, and/or any suitable models.

In a first illustrative example, a thermal model (e.g., for a temperature distribution, thermal diffusion, local temperatures, etc. within a battery pack or external system) can be represented as: $\dot{T}_i = \Sigma_j M_{i,j} T_j + b_i$, where $\dot{T}_i$ is the change in temperature with respect to time of element i (e.g., where an element can refer to a cell, a group of cells, a cell and nearby thermal mass, a component of a cell, etc.), $M_{i,j}$ is a matrix of interdependencies relating the current temperature distribution to the rate of change of the temperature distribution at each element, $T_j$ is the temperature of element j, and $b_i$ is a source term (e.g., boundary conditions, electrochemical heat generation, external sources, etc.). In a second illustrative example, an electrothermodynamic heat generation model can be represented as:

$$\dot{Q} = \dot{Q}_{irrev} + \dot{Q}_{rev} = I(U-V) - IT\frac{\partial U}{\partial T}|_q,$$

where $\dot{Q}$ is the change in heat of an element, $\dot{Q}_{irrev}$ can be attributed to a change in heat due to an internal resistor, $\dot{Q}_{rev}$ can be attributed to changes in heat due to reversible processes, I is the element current, U is the element open circuit voltage, V is the potential drop of the element, T is the temperature, and q is the charge. In a third specific example, a battery cell can be modeled as a voltage source (e.g., a voltage source with a voltage approximately equal to the open circuit voltage) and a resistor (e.g., with an internal resistance). In a variation of the third specific example, the internal resistance can be modelled according to R=V/I (where R can be the internal resistance of the cell or supercell, V can be approximately an open circuit voltage of the cell, and I can be the current). In a second variation, the internal resistance can be modelled as a function of battery state of charge, internal temperature (e.g., which can be a modelled value or a measured value), current, voltage (e.g., open circuit voltage), ion distribution within the battery, ion diffusion within the battery, and/or any suitable term(s) or combinations. In a fourth specific example, a battery pack can be modelled as a plurality of battery cells, with n cells in series and N cells in parallel. In a fifth illustrative example, a battery pack can be modeled as N cells in parallel (e.g., where cells in series can be modeled as a single effective cell). In a sixth illustrative example, an equivalent circuit model can be parameterized by a relationship among information (e.g., temperature, state of charge, age, battery properties, battery states, etc.) pertaining to, associated with, and/or describing a battery. In a seventh illustrative example, an electrochemical model can include and/or be represented by one or more: equivalent circuit models, combinations of equivalent circuit models with electrical components, fully electrochemical models (e.g., single particle models, single particle models with electrolyte, first principles electrochemical models, etc.), integrated electrochemical and thermal models (e.g., tracking temperature and lithium concentration such as in another electrochemical model), and/or any suitable electrochemical models. However, any suitable models can be used.

The controller can function to use (e.g., leverage, perform, etc.) a control law to determine (e.g., provide) operating instructions (e.g., recommendations, requirements, proposed limits, etc.) for the battery (e.g., to achieve or exceed a target degradation, to achieve or exceed target performance metrics, etc.). However, the controller can otherwise function. The operating instructions can be a recommended operating parameter space, a closed space of operation, precise operation values, a range of acceptable operation values, and/or can include any suitable battery operation instructions. The operating instructions can be provided as a bounding box (e.g., providing bounding values for controlled and/or uncontrolled battery inputs such that a target degradation can occur), a polytope of constraint (e.g., bounding the operating parameters along multiple potential operating parameters), fixed values, and/or can have any suitable form. The operating instructions are typically set for a particular confidence (e.g., a confidence that a battery operated according to the operating instructions will follow a target degradation). For instance, the operating instructions can be a 50% confidence, 75% confidence, 80% confidence, 90% confidence, 95% confidence, 97% confidence, 98% confidence, 99% confidence, 99.5% confidence, 99.9% confidence, 99.99% confidence, 99.995% confidence, 99.999% confidence, and/or to achieve any suitable confidence. However, the operating instructions can have any suitable confidence, can be guaranteed (e.g., for a predetermined amount of time relative to the current time), and/or can otherwise be provided (e.g., as a maximum value, minimum value, average value, median value, etc.).

The controller can be implemented on a local computing system, remote computing system, and/or distributed between the local and remote computing system. For instance, a local controller can be beneficial for operation of a single battery system, while a remote or distributed controller can be beneficial for generating operating instructions that are determined across a fleet of battery systems. However, the controller can otherwise be arranged or distributed (e.g., a remote controller can be used for an individual battery system).

Examples of controllers can include: PI controllers, PID controllers, PD controllers, machine learning algorithms (e.g., neural networks, random forest regression and classification, support vector regression and classification, symbolic regression, k-nearest neighbors, artificial neural network, interpretable machine learning, explainable machine learning, long-short term memory network, Shapley additive explanations (SHAP) analysis, neural differential equations, clustering algorithms, etc. such as trained on a set of test batteries, each battery of the set of test batteries operated with different operating conditions and with measured, at least periodically, aging profiles), hybrid physics and machine learning models, Gaussian process regression, and/or any suitable controller(s) can be used.

Figure 6:
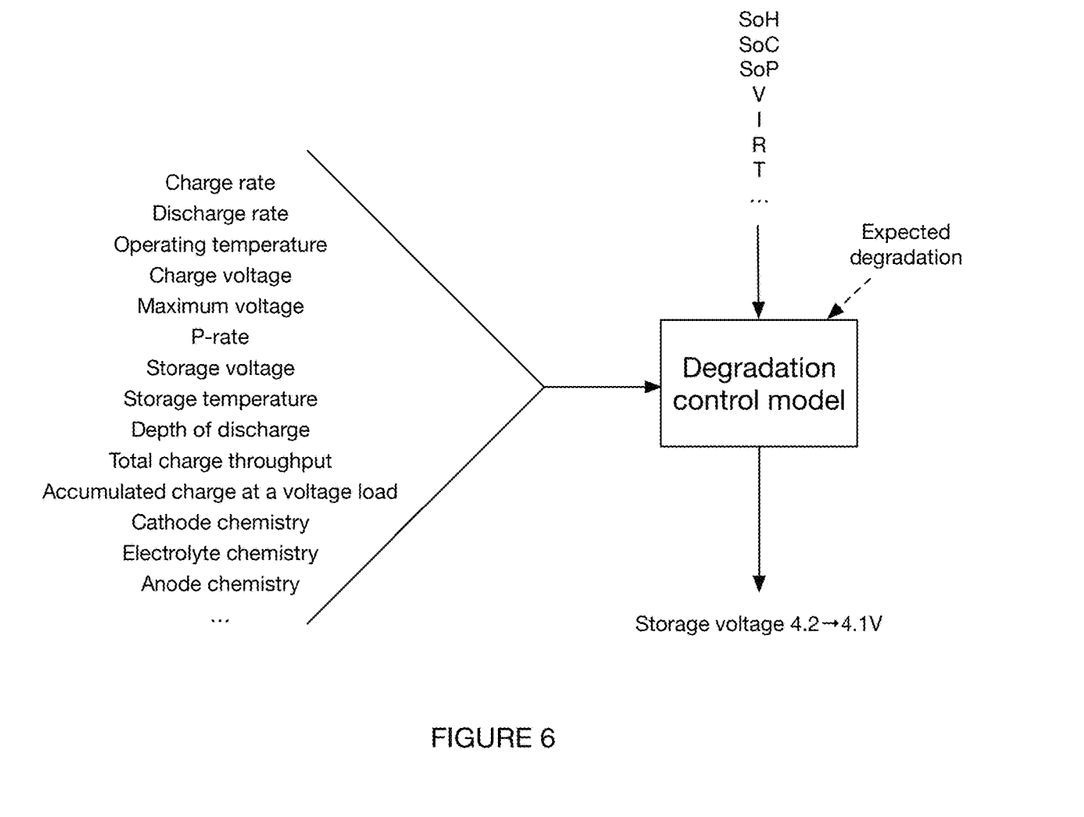
FIG. 6 is a schematic representation of an example of using a degradation control model to determine recommended operating parameters.

Inputs to the controller (e.g., as shown for example in FIG. 6) can include: controlled inputs (e.g., battery properties that can be controlled such as maximum operating voltage, minimum operating voltage, an external system set temperature such as an HVAC temperature, a c-rate, a maximum c-rate, a discharge rate, a maximum discharge rate, a charge voltage, P-rate, storage voltage, capacity, charge, SoC utilization range, DoD utilization range, total charge throughput, accumulated charge at a voltage load, etc.), uncontrolled or poorly controlled inputs (e.g., temperature such as an external system or battery actual temperature; humidity; pressure; impacts; changes in external system operating conditions such as road conditions, incline, wind speed, wind direction, weather conditions, etc.; etc.), static battery properties (e.g., cathode chemistry, anode chemistry, electrolyte chemistry, first charging conditions, SEI characteristics, battery cell arrangements, component sizing, auxiliary components such as heat sink arrangement, etc.), battery states or properties (e.g., directly measured, determined using a state estimator, determined using a model, etc.), aging profile (e.g., degradation profile, target degradation, etc.), battery operation constraints (e.g., minimum, maximum, ranges, gradients, etc. of controlled or uncontrolled inputs), battery degradation curves (e.g., predicted battery degradation, target battery degradation, worst acceptable battery degradation, etc.), battery application (e.g., operator, load properties, types of battery operation such as removable battery, etc.), and/or any suitable information or data can be input to the controller. In some variants (particularly for a fleet of batteries, but also applicable to individual batteries or subsets of a battery fleet), the inputs can further include information about a distribution of values in the inputs. For instance, a distribution of the depth of discharge, exceptional conditions (e.g., temperatures, impacts, etc.), temperatures, and/or other suitable distributions. Relatedly, the inputs can include correlations between inputs. For instance, the controller can access (e.g., receive as input, determine, etc.) information about correlations between temperature (e.g., HVAC, thermal management, etc.) and battery performance. However, other correlations can be determined as well. The inputs to the controller can be current values (e.g., derived from or including the most recent sensor readings), historical values (e.g., for a predetermined lookback time window, undersampled historical values across a lifetime of the battery to date, all values across a lifetime of the battery to date, etc.), and/or can be associated with any suitable time (e.g., future or predicted future conditions such as upcoming changes in battery operation, changes in external system operation, etc.). The inputs to the controller can be for a single battery and/or for a plurality of batteries (e.g., each battery of a battery fleet; a subset of batteries of a battery fleet such as a batteries with a common chemistry, similar aging profiles, similar operating conditions, etc.; etc.). For example, a state of health and/or proxy therefor (e.g., capacity, resistance, power, energy, etc. such as at an instant in time, relative to an initial value, etc.) can be provided to the controller.

Outputs from the controller are preferably battery operating instructions (e.g., bounds on controlled and/or uncontrolled inputs that will allow the battery to meet or exceed, i.e., degrade less than, the target battery degradation; to meet or exceed the target battery performance with a threshold performance). In variants where uncontrolled inputs are supplied, the uncontrolled inputs can be leveraged to inform design of additional or alternative batteries to bring onto a fleet, change the specific battery, and/or can otherwise be leveraged. However, the controller can output any suitable data. Typically, the controller has information (e.g., derived from first principles, based on empirical data, based on published data, based on data from other members of a battery fleet, etc.) about at least a direction a change in an operating condition will result in the battery. In some cases, a magnitude (or approximate magnitude such as order of magnitude within a factor of 2, etc.) of change can be known as well. However, the controller may not know the impact of a particular change (and therefore may provide operation instructions to better inform the controller for future batteries of the impact of a given change).

In some variants (particularly but not exclusively in compute constrained environments), the controller can operate using a limited range of inputs and/or potential outputs. In these variants, typically only the inputs or outputs that are expected to have the greatest impact (e.g., magnitude of impact, direction of impact) are included. However, these variants can leverage a dynamic input and/or output approach. As a first example of a dynamic approach, different iterations can evaluate the impact of different possible operating conditions. As a second example of a dynamic approach, after a first operating condition change has been applied to the battery, the subset of operating conditions can remove that specific operating condition from evaluation (optionally including a new operating condition for evaluation). As an illustrative example, after reducing the charging voltage from a higher threshold to a lower threshold, the charging voltage can be removed from evaluation (e.g., as typically further lowering is not expected to have a significant impact on the battery degradation). As another illustrative example, after reducing a charging rate, the charging rate can be excluded from potential operating conditions. However, other suitable dynamic approaches (e.g., leveraging a remote computing system to inform performance on a local computing system) can be applied.

In some variants, outputs from the controller can include an operation mode for the battery (and/or battery fleet). Exemplary operation modes could include: an observability mode (e.g., a diagnostic mode), a throttled performance mode (e.g., operating with reduced capabilities such as reducing the charging and/or discharging rate, reduced utilization of depth of discharge, decreased charging voltage, narrower range of storage conditions, narrower range of operating conditions, reduced frequency of charging or discharging, etc.), enhanced performance mode (e.g., operating with increased capabilities such as increased charging and/or discharging rate, increased depth of discharge range, increased charging voltage, wider range of storage conditions, wider range of operating conditions, increased frequency of charging and/or discharging, etc.), normal performance (e.g., operating with conditions within the battery's specified operating range), charge balancing mode (e.g., specifications for balancing charge between battery cells), service mode (e.g., minimal or no further operations should be performed using the battery until the battery is services), and/or other suitable modes. Examples of diagnostic modes (which can be beneficial for improving observability into batteries and/or battery fleets) can include: thermal diagnostic modes (e.g., to evaluate thermal behavior of the battery such as thermal test by providing temperature pulses; thermal shock testing by providing a sudden change to the thermal management of the battery or environment temperature; thermal equilibrium testing such as determining an equilibrium that the battery achieves in a stable environment, monitoring a time for the battery to achieve a target temperature in a given environment, etc.; temperature gradient testing such as determining thermal distribution over the battery when exposed to a temperature gradient; point or areal temperature measuring; etc.), electrical or electrochemical diagnostics (e.g., differential voltage analysis; slow cycling mode such as with C-rates less than about 1C;

pulse diagnostic mode such as with a voltage spike that lasts for less than a threshold time such as 0.1 s; etc.), an anode overhang determination mode (e.g., a mode for estimating anode overhang sizing), and/or other suitable diagnostic modes. However, instead of being discrete or separate modes, the operating instructions can continuously change between similar conditions or instructions (without explicitly being in a mode of operation).

In some variants, the controller can be an asymmetric controller such that a different prediction (e.g., estimation, recommendation, etc.) is made for a battery that is outperforming relative to a target degradation (e.g., degrading less than predicted, degrading less than would be acceptable, etc.) as compared to a battery that is underperforming relative to a target degradation. For instance, when a battery is outperforming the target degradation, the controller can recommend greater battery utilization (e.g., faster charge or discharge, longer time between charge such as using a greater range of SoC, etc.) whereas when the same battery were underperforming the target degradation, the controller could have recommended lesser battery utilization (e.g., slower charge or discharge, shorter time between charge such as using a smaller range of SoC, etc.). These variants can be achieved, for example, by tuning the controller performance separately for underperformance and overperformance (and potentially within a threshold performance of the target degradation), using the controller only in one condition (e.g., only leveraging the controller when a battery is underperforming such as to extend the battery lifetime, only leveraging the controller when a battery is overperforming such as to ensure that the battery is utilized to its fullest, etc.), and/or can otherwise be achieved. In some examples of an asymmetric controller, the controller can additionally or alternatively be tuned based on an economic cost of the battery. However, the controller can be symmetric.

In some variants, the state estimator, model, and/or controller (as shown for example in FIG. 6) can leverage battery fleet data to improve the battery property determination, battery state estimation, and/or operating instruction determination. For instance, the state estimator and/or model can perform fleet based filtering on the datasets (e.g., inputs), can identify relationships (e.g., between battery properties and/or battery states) based on fleet level information (e.g., via machine learning algorithms such as reinforcement learning, supervised learning, unsupervised learning, etc.), can transfer learning between batteries within a fleet (e.g., leverage observations from older batteries in a fleet to inform battery operating instructions for newer batteries, leverage information gleaned from batteries in increase observability modes to inform batteries that have not been in such a mode recently, leverage learnings from a first fleet in a second fleet, generating a feature set associated with degradation and apply the feature set as a metric or fingerprint for degradation, etc.), validation (e.g., model validation, state estimator validation, control instruction validation, etc.), provide recommended operating instructions despite noisy signals (e.g., when sensor data for an individual battery is too noisy for accurate state estimation, the controller can leverage information aggregated across a fleet to inform or generate operating instructions, estimate a state, etc.), and/or can otherwise leverage the fleet information. In an illustrative example (e.g., of accessing information despite noisy data), voltage and current measurements on peak currents across a fleet of batteries enabled determination of a high resolution direct current internal resistance (DCIR) curve for the batteries of the fleet (e.g., by averaging across the batteries despite the measurements not being synchronized). As another example, operating conditions (e.g., operator, utilization, operating voltage, storage condition, temperature, depth of discharge, etc.) for individual battery assets can be determined to optimize deployment across the fleet and/or to optimize the individual battery asset based on information about operations from other batteries within a fleet. As a third example, However, the fleet information can otherwise be leveraged or applied.

4. METHOD

As shown in FIG. 1, the method can include receiving sensor measurements S100, determining a battery state S200, predicting battery aging S300, determining battery operation parameters S400, and/or any suitable steps. The method can function to determine how a battery is aging (e.g., relative to a target battery degradation), determine battery operation instructions (e.g., battery operation parameters, battery operation conditions, etc.) to optimize the battery operation (e.g., extend useful life of the battery, delay timeline for exchanging a battery, The method is preferably performed in real or near-real time (e.g., relative to a sensor latency, to a battery-operated system operation time, etc.), but can be performed delayed and/or with any suitable timing. The method (or steps thereof) are preferably performed automatically (e.g., continuously), but can be performed responsive to a trigger, a request or call for method operation, manually (e.g., responsive to a request from an operator or user), and/or with any suitable timing. The method is preferably performed by a system as described above, but can be performed by any suitable system.

Receiving sensor measurements S100 functions to receive sensor measurements associated with a battery of the battery-operated system. The sensor measurements are preferably made by a sensor, but can be made by any suitable component. The sensor measurements can be received from the sensor, received from a computing system (e.g., memory, storage, database, etc.), and/or from any suitable component. The sensor measurements can include non-local measurements (e.g., measurements not tied to a specific battery cell) and/or local measurements (e.g., one or more sensor measurements for each battery cell). In variants, each cell of a battery can include a sensor, each module of a battery can include a sensor, each battery pack can include a sensor, a subset of cells can include a sensor, a subset of modules can include a sensor, a subset of packs can include a sensor, and/or the sensor can otherwise be associated with any suitable battery(s).

Examples of sensor measurements include: temperature (e.g., average temperature, instantaneous temperature, surface temperature, internal temperature, etc. such as at a heat sink coupled to a plurality of battery cells; environment temperature; etc.), pressure (e.g., cell swelling against a physical constraint), force (e.g., impact), voltage (e.g., instantaneous voltage, open circuit voltage, etc.), current (e.g., instantaneous current, short circuit current, etc.), and/or any suitable sensor data.

Determining a battery state S200 functions to determine one or more battery property. S200 is preferably performed using a state estimator (e.g., as described above), but can be performed using a model (e.g., a model defining a relationship between a battery state and one or more sensor measurements) and/or in any suitable manner. The battery properties can be determined from individual sensor measurements, individual sensor measurement time points, a plurality of sensor measurements, historical sensor measurements, and/or any suitable sensor measurements. The battery state is preferably retained (e.g., stored) to facilitate tracking of changes in the battery state over time.

For instance, S200 can determine (e.g., calculate, estimate, etc.) a battery state of charge, state of health, state of energy, state of power, local battery cell temperature, battery impedance, internal temperature, ohmic resistance, ion distribution, and/or other suitable battery properties or states can be determined.

Figure 2:
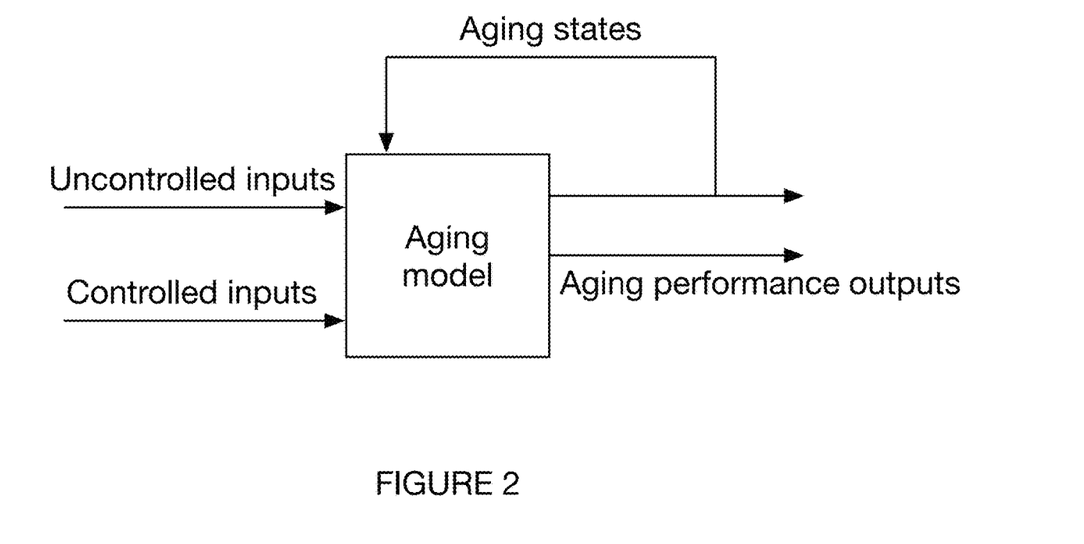
FIG. 2 is a schematic representation of an example of a model for determining (e.g., predicting, estimating, etc.) aging of a battery.

Predicting battery aging S300 functions to determine an extent to which a battery has aged thus far, how a battery is predicted to age based on the current and/or historic battery state, and/or can otherwise function. S300 can be performed using a model (e.g., an aging model such as a relationship between battery states, controlled inputs, uncontrolled inputs, and time, as shown for example in FIG. 2, etc.), using a state estimator (e.g., a look-ahead state estimator operating using an aging model, in addition to or as an alternative to a steady-state or fixed time model, such as a model as described above that is further tuned on, trained on, validated for, etc. changes in the battery state as a function of time), using a fitting tool (e.g., fitting current and/or historic battery properties fit to a curve and extrapolated to an aging time), using a controller (e.g., where the controller predicts the battery aging based on feedback from observed signals and a battery aging model) and/or using any suitable component.

The predicted battery aging in S300 can be performed up to a validated age of a model or state estimator (e.g., a maximum amount of lookahead for which the model or state estimator is validated to estimate), indefinitely, up to a target age, for a predetermined time window (e.g., 1 day, 1 week, 2 weeks, 1 month, 2 months, 3 months, 4 months, 6 months, 9 months, 12 months, 2 years, 3 years, 4 years, 6 years, 10 years, 15 years, 20 years, etc. from the current time into the future), and/or for any suitable time range or time window.

In some variants, an aging model (e.g., degradation model) can be adapted (e.g., selected, updated, etc.) in real- or near-real time. These variants can be particularly beneficial when an aging model appears to be giving poor results. In a specific example, the aging model can be adapted using a multi-hypothesis estimator. However, the aging model can be adapted in any manner.

S300 can include simulating battery aging by running a state estimator forward in time for a set of controlled battery inputs. The simulated battery aging can be used (e.g., in S400) as the predicted battery aging. In some variants, a plurality of simulations can be performed (e.g., with different sets of controlled and/or uncontrolled battery inputs, with different values for one or more controlled and/or uncontrolled battery inputs, etc.) to yield a set of estimations.

Determining battery operation parameters S400 functions to determine battery operation parameters to achieve (e.g., that could enable to achieve) a target battery degradation. S400 is preferably performed by a controller, but can be performed using any suitable component. For instance, S400 can include selecting a battery operating condition from a set of battery operating conditions evaluated in S300 (e.g., based on the predicted degradation for each of the battery operating conditions evaluated).

In variants, S400 can determine battery operation conditions to achieve a target degradation value (e.g., value of one or more battery properties at a given battery age), a target rate of degradation (e.g., rate of change of one or more battery properties at a given battery age), a target higher order derivative of one or more battery properties with respect to time, combinations thereof, match a degradation curve (e.g., be within a threshold range of a degradation curve across time), and/or can determine battery operation conditions to achieve any suitable target.

In variants (particularly for operating instructions across a fleet of batteries), S400 can determine battery operation conditions that optimize a calendar life of the battery fleet as a whole, optimize a calendar life for a subset of batteries of the battery fleet, optimize a cost of the batteries (e.g., maximize a return from leveraging the batteries while minimizing the cost to replace battery units from degradation), optimize an uptime (e.g., minimize a maintenance time, minimize a charging time) across the fleet, optimize for knowledge gained from assets (e.g., increase observability into the fleet and/or individual batteries thereof, improve knowledge of the directional or magnitudinal impact of operating conditions on battery health, etc.), and/or can otherwise optimize other suitable information.

Exemplary optimization functions include least-squares approach, a weighted least squares approach, a linear least squares approach, a non-linear least squares approach, least absolute deviations approach, M-estimation approach, etc.), maximum likelihood estimation, Bayesian estimation methods, voting, machine learning, and/or other suitable optimization functions. Note that while the term optimal is used, the term is not limited to the global optimal but can additionally or alternatively refer to a local optimal and/or other conditions that can exceed a threshold performance.

Figure 3:
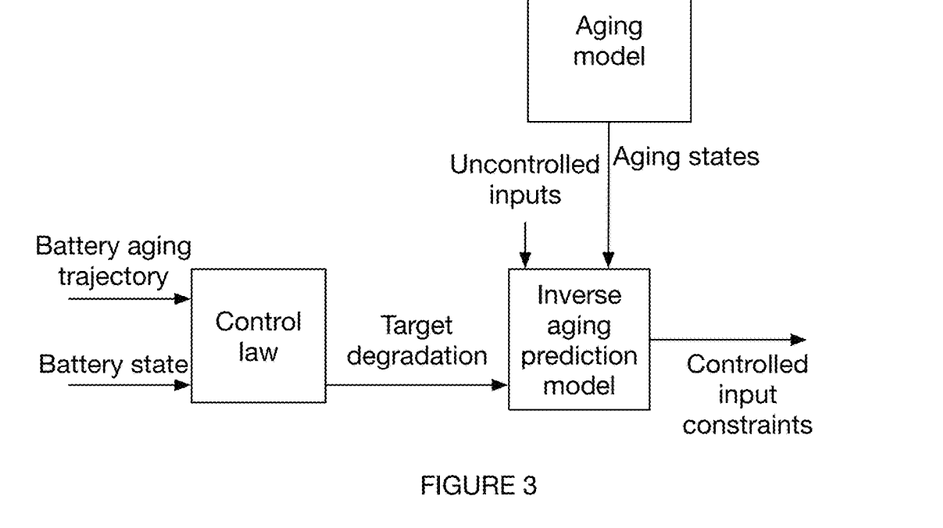
FIG. 3 is a schematic representation of an example of determining battery operation constraints (e.g., based on a current battery state, based on controlled inputs to the battery, based on uncontrolled inputs to the battery, based on a target degradation curve, etc.).

As a specific example (as shown for instance in FIG. 3), a controller can receive the predicted battery aging and/or simulated battery aging (from S300), the battery state (from S200), a target battery degradation (e.g., from a user, from an operator, prestored in the controller, from a battery manufacturer, etc.) and/or any suitable inputs to determine battery operating conditions (e.g., bounds on controlled and/or uncontrolled battery inputs to achieve the target battery degradation).

S400 could include executing the battery operation instructions (e.g., operating the battery with battery operations within the constraints as determined during S400). In other variants, S400 can include transmitting the battery operating instructions (e.g., to an operator, to the external system, etc.) which can determine updated operations and/or can make a determination to continue operating within a prior set of operations (e.g., accepting a risk that the battery will degrade without following the degradation curve).

In a first illustrative example a method can comprise for each battery of a plurality of batteries: receiving sensor measurements comprising at least one of voltage, current, or temperature of the respective battery; and determining a state of health of the respective battery using a state estimator to process the sensor measurements; aggregating the state of health for each battery of the plurality of batteries; and based on the aggregated states of health, determining operating instructions for each battery of the plurality of batteries.

In a second illustrative example, the method of the first illustrative example, wherein the operating instructions minimize a total degradation of the plurality of batteries.

In a third illustrative example, the method of the first or second illustrative example, wherein aggregating the state of health comprises aggregating the state of health for batteries from the plurality of batteries with at most a threshold utilization time to form a first aggregated dataset; and independently aggregating the state of health for batteries from the plurality of batteries with greater than the threshold utilization time to form a second aggregated dataset, wherein the second aggregated dataset is used to determine operating instructions for batteries associated with the first aggregated dataset.

In a fourth illustrative example, the method of the first, second, or third illustrative example, wherein the operating instructions comprise one or more battery operation condition selected from charging rate; discharging rate; charging voltage; depth of discharge range; operating temperature; operating voltage; storage temperature; storage voltage; battery operating lifetime (e.g., when to retire the battery, how long as either relative to current operation or absolute amount of time to operate the battery, etc. such as a SoH target for retiring the battery); accumulated charge at a given voltage load; and total charge throughput.

In a fifth illustrative example, the method of the fourth illustrative example, wherein when the operation instructions for a battery of the plurality of batteries comprises a change in one battery operation condition, subsequent operation instructions for the battery do not comprise a change in the one battery operation condition.

In a sixth illustrative example, the method of the first, second, third, fourth, or fifth illustrative example, wherein the operation instructions comprise instructions for operating a subset of batteries of the plurality of batteries in a diagnostic mode configured to improve observability into the state of health of the subset of batteries.

In a seventh illustrative example, the method of the sixth illustrative example, wherein the diagnostic mode comprises a pulse diagnostic mode wherein a current pulse of at least 0.1 A/s is applied to the batteries of the subset of batteries and sensor measurements are recorded contemporaneously with or subsequent to the current pulse.

In an eighth illustrative example, the method of the first, second, third, fourth, fifth, sixth, or seventh illustrative example, wherein the state estimator comprises at least one of: a Kalman filter, an unscented Kalman filter, an extended Kalman filter, Schmidt-Kalman filter, a Gaussian process, particle filter, and/or other suitable state estimator.

In a ninth illustrative example, the method of the first, second, third, fourth, fifth, sixth, seventh, or eighth illustrative example, wherein the state estimator uses one or more model selected from: battery pack geometry model, sensor model, electrical components model, thermal transport model, battery cell heat generation model, battery cell heat transport model, equivalent circuit model, or battery cell electrochemical model.

In a tenth illustrative example, the method of the ninth illustrative example, wherein the model a parameterized model, wherein the parameterized model is parameterized as a function of one or more of: temperature, current, voltage, resistance, state of charge, battery age, time, or combinations of these variables (e.g., time spent at a voltage; current rate passed at, above, or below a threshold temperature; etc.).

In an eleventh illustrative example, a system can comprise: a battery comprising one or more battery cell; a sensor configured to measure sensor measurements comprising one or more of a voltage, current, temperature, or resistance of the battery; and a processor configured to: receive the sensor measurements; estimate a state of the battery using the sensor measurements; determine a current degradation of the battery based on the state of the battery; and determine operating conditions for the battery to achieve a target degradation based on the current degradation of the battery.

In a twelfth illustrative example, the system of the eleventh illustrative example, wherein the state of the battery is estimated using a state estimator comprising one of: a Kalman filter, an unscented Kalman filter, an extended Kalman filter, or a Gaussian process.

In a thirteenth illustrative example, the system of the twelfth illustrative example, wherein the state estimator uses one or more model selected from: battery pack geometry model, electrical components model, thermal transport model, battery cell heat generation model, battery cell heat transport model, equivalent circuit model, or battery cell electrochemical model.

In a fourteenth illustrative example, the system of the thirteenth illustrative example, wherein the model a parameterized model, wherein the parameterized model is parameterized as a function of one or more of: temperature, current, voltage, resistance, state of charge, battery age, time, or combinations of these variables (e.g., time spent at a voltage; current rate passed at, above, or below a threshold temperature; etc.).

In a fifteenth illustrative example, the system of the eleventh, twelfth, thirteenth, or fourteenth illustrative example, wherein determining the operating conditions further comprises determining operating conditions that improve an accuracy or observability of the state of the battery.

In a sixteenth illustrative example, the system of the fifteenth illustrative example, wherein operating conditions that improve an accuracy or observability of the state of the battery comprise operating the battery in a slow cycle mode or current pulsed mode.

In a seventeenth illustrative example, the system of the eleventh, twelfth, thirteenth, fourteenth, fifteenth, sixteenth, or seventeenth illustrative example, wherein the system further comprises a remote computing system configured to: receive battery states from a plurality of batteries; generate operating instructions across the plurality of batteries based on the battery states from the plurality of batteries and an optimization goal; and transmit the operating instructions for the battery to the processor.

In an eighteenth illustrative example, the system of the eleventh, twelfth, thirteenth, fourteenth, fifteenth, sixteenth, or seventeenth illustrative example, wherein the operating instructions comprise one or more battery operation condition selected from: charging rate; discharging rate; charging voltage; depth of discharge range; operating temperature; operating voltage; storage temperature; battery operating lifetime (e.g., when to retire the battery, how long as either relative to current operation or absolute amount of time to operate the battery, etc. such as a SoH target for retiring the battery); storage voltage; accumulated charge at a given voltage load; and total charge throughput.

In a nineteenth illustrative example, the system of the eighteenth illustrative example, wherein when the operation instructions comprise a change in one battery operation condition, subsequent operation instructions for the battery do not comprise a change in the one battery operation condition.

In a twentieth illustrative example, the system of the eighteenth illustrative example, wherein determining the operation instructions comprises evaluating at most five of the battery operating conditions.

In a twenty-first specific example, the system of any of Specific Examples 11-20, configured to perform the method of any of Specific Examples 1-10.

In a twenty-second specific example, a system configured to perform the method of any of Specific Examples 1-10. In a twenty-second specific example, system of Specific Example 22, further comprising one or more elements such as described regarding any of Specific Examples 11-20.

The methods of the preferred embodiment and variations thereof can be embodied and/or implemented at least in part as a machine configured to receive a computer-readable medium storing computer-readable instructions. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 5%, 10%, 20%, 30% of a reference), or be otherwise interpreted.

As a person skilled in the art will recognize from the previous detailed description and from the figures and claims, modifications and changes can be made to the preferred embodiments of the invention without departing from the scope of this invention defined in the following claims.

We claim:

1. A method comprising:
    for each battery of a plurality of batteries:
        measuring sensor measurements comprising at least one of voltage, current, or temperature of the respective battery using a set of sensors; and
        determining a state of health of the respective battery using a state estimator to process the sensor measurements;
    aggregating the state of health for each battery of the plurality of batteries, wherein aggregating the state of health comprises:
        aggregating the state of health for batteries from the plurality of batteries with at most a threshold utilization time to form a first aggregated dataset; and
        independently aggregating the state of health for batteries from the plurality of batteries with greater than the threshold utilization time to form a second aggregated dataset; and
    based on the aggregated states of health, determining operating instructions for each battery of the plurality of batteries; wherein the second aggregated dataset is used to determine operating instructions for batteries associated with the first aggregated dataset.

2. The method of claim 1, wherein the operating instructions minimize a total degradation of the plurality of batteries.

3. The method of claim 1, wherein the operating instructions comprise one or more battery operation condition selected from:
    charging rate;
    discharging rate;
    charging voltage;
    depth of discharge range;
    operating temperature;
    operating voltage;
    storage temperature;
    storage voltage;
    battery operating lifetime;
    accumulated charge at a given voltage load; and
    total charge throughput.

4. The method of claim 3, wherein when the operation instructions for a battery of the plurality of batteries comprises a change in one battery operation condition, subsequent operation instructions for the battery do not comprise a change in the one battery operation condition.

5. The method of claim 1, wherein the operation instructions comprise instructions for operating a subset of batteries of the plurality of batteries in a diagnostic mode configured to improve observability into the state of health of the subset of batteries.

6. The method of claim 5, wherein the diagnostic mode comprises a pulse diagnostic mode wherein a current pulse of at least 0.1 A/s is applied to the batteries of the subset of batteries and sensor measurements are recorded contemporaneously with or subsequent to the current pulse.

7. The method of claim 1, wherein the state estimator comprises at least one of: a Kalman filter, an unscented Kalman filter, an extended Kalman filter, Schmidt-Kalman filter, a Gaussian process, or a particle filter.

8. The method of claim 1, wherein the state estimator uses one or more model selected from: battery pack geometry model, sensor model, electrical components model, thermal transport model, battery cell heat generation model, battery cell heat transport model, equivalent circuit model, or battery cell electrochemical model.

9. The method of claim 8, wherein the model is a parameterized model, wherein the parameterized model is parameterized as a function of one or more of: temperature, current, voltage, resistance, state of charge, battery age, time, or combinations thereof.

10. A system comprising:
    a battery comprising one or more battery cell;
    a sensor configured to measure sensor measurements comprising one or more of a voltage, current, temperature, or resistance of the battery; and
    a processor configured to:
        receive the sensor measurements;
        estimate a state of health of the battery using the sensor measurements;
        aggregate the state of health of the battery with a plurality of states of health for a plurality of batteries, wherein aggregating the state of health comprises:
            aggregating the states of health for the battery and batteries from the plurality of batteries with at most a threshold utilization time to form a first aggregated dataset; and
            independently aggregating the states of health for the battery and batteries from the plurality of batteries with greater than the threshold utilization time to form a second aggregated dataset; and
        determine a current degradation of the battery based on the state of the battery; and
        determine operating conditions for the battery to achieve a target degradation based on the current degradation of the battery; wherein the second aggregated dataset is used to determine operating instructions for the battery when the battery is associated with the first aggregated dataset.

11. The system of claim 10, wherein the state of the battery is estimated using a state estimator comprising one of: a Kalman filter, an unscented Kalman filter, an extended Kalman filter, Schmidt-Kalman filter, a Gaussian process, or a particle filter.

12. The system of claim 11, wherein the state estimator uses one or more model selected from: battery pack geometry model, sensor model, electrical components model, thermal transport model, battery cell heat generation model, battery cell heat transport model, equivalent circuit model, or battery cell electrochemical model.

13. The system of claim 12, wherein the model is a parameterized model, wherein the parameterized model is parameterized as a function of one or more of: temperature, current, voltage, resistance, state of charge, battery age, time, or combinations thereof.

14. The system of claim 10, wherein determining the operating conditions further comprises determining operating conditions that improve an accuracy or observability of the state of the battery.

15. The system of claim 14, wherein operating conditions that improve an accuracy or observability of the state of the battery comprise operating the battery in a slow cycle mode or current pulsed mode.

16. The system of claim 10, wherein the system further comprises a remote computing system configured to:

receive battery states from a plurality of batteries;
generate operating instructions across the plurality of batteries based on the battery states from the plurality of batteries and an optimization goal; and
transmit the operating instructions for the battery to the processor.

17. The system of claim 10, wherein the operating instructions comprise one or more battery operation condition selected from:
charging rate;
discharging rate;
charging voltage;
depth of discharge range;
operating temperature;
operating voltage;
storage temperature;
storage voltage;
battery operating lifetime;
accumulated charge at a given voltage load; and
total charge throughput.

18. The system of claim 17, wherein when the operation instructions comprise a change in one battery operation condition, subsequent operation instructions for the battery do not comprise a change in the one battery operation condition.

19. The system of claim 17, wherein determining the operation instructions comprises evaluating at most five of the battery operating conditions.

* * * * *